US006495191B1

(12) United States Patent
Maldonado

(10) Patent No.: US 6,495,191 B1
(45) Date of Patent: Dec. 17, 2002

(54) WHEAT FLOUR FOR MINERAL-ENHANCED BAKERY PRODUCTS

(76) Inventor: Alfonso Maldonado, P.O. Box 1293, Guanica, PR (US) 00653

( * ) Notice: Subject to any disclaimer, the term of this patent is extended or adjusted under 35 U.S.C. 154(b) by 0 days.

(21) Appl. No.: 09/633,777

(22) Filed: Aug. 7, 2000

Related U.S. Application Data

(62) Division of application No. 09/220,886, filed on Dec. 28, 1998, now Pat. No. 6,126,982.

(51) Int. Cl.$^7$ ................................................ A21D 2/00
(52) U.S. Cl. ........................ 426/622; 426/74; 426/94; 426/496; 426/549
(58) Field of Search ........................ 426/94, 496, 549, 426/622, 74

(56) References Cited

U.S. PATENT DOCUMENTS

| | | | |
|---|---|---|---|
| 2,239,543 A | * 1/1941 | Andrews et al. ............ | 426/622 |
| 2,230,417 A | * 2/1941 | Wellinghoff ................ | 426/622 |
| 2,357,069 A | * 8/1944 | Barackman .................. | 426/622 |
| 2,358,827 A | * 9/1944 | Rakowsky et al. ......... | 426/622 |
| 2,895,831 A | 7/1959 | Zacharia | |
| 3,091,538 A | 5/1963 | Zacharia | |
| 3,365,300 A | * 1/1968 | Thomas ...................... | 426/622 |
| 3,573,061 A | 3/1971 | Glabe et al. | |
| 3,832,472 A | 8/1974 | Rodgers et al. | |
| 3,882,251 A | * 5/1975 | Bell ............................ | 426/622 |
| 3,945,312 A | 3/1976 | Borisov et al. | |
| 3,979,375 A | 9/1976 | Rao et al. | |
| 4,133,899 A | 1/1979 | Wolffing et al. | |
| 4,201,708 A | 5/1980 | Rao et al. | |
| 4,244,980 A | * 1/1981 | Fischer ....................... | 426/622 |
| 4,594,260 A | 6/1986 | Vaqueiro | |
| 4,710,386 A | 12/1987 | Fulger et al. | |
| 4,741,913 A | 5/1988 | Satake | |
| 5,141,764 A | 8/1992 | Wellman | |
| 5,194,276 A | 3/1993 | Hoseney et al. | |
| 5,211,982 A | 5/1993 | Wellman | |
| 5,260,082 A | 11/1993 | delValle et al. | |
| 5,514,387 A | 5/1996 | Zimmerman et al. | |
| 5,556,655 A | 9/1996 | Vadlamani et al. | |
| 5,560,953 A | 10/1996 | Greenwell et al. | |
| 6,126,982 A | 10/2000 | Maldonado | |

FOREIGN PATENT DOCUMENTS

| | | |
|---|---|---|
| EP | 0 468 774 A2 | 1/1992 |
| EP | 0 588 496 A1 | 3/1994 |
| EP | 0 609 169 A2 | 8/1994 |
| GB | 2 013 077 | 8/1979 |
| WO | WO 98/48637 | 11/1998 |

OTHER PUBLICATIONS

Y. Pomeranz, "Wheat Chemistry and Technology", pp. 14–17, 1988.*

Czajka–Narins, "Chapter 7 Minerals", Nutrition Basics, No date.

Rajchel, C.L., et al. *The Bakers Digest*, "Wheat Bran and Middings" Jun. 1975 pp. 27–30.

Pyler, E.J., *Baking Science & Technology*, vol. 1, pp. 300–305, (1982).

Jenkins, Sylvia M., *Bakery Technology*, Book 1 Bread, p. 19, 26, Fig. 18, (1975).

* cited by examiner

*Primary Examiner*—Lien Tran
(74) *Attorney, Agent, or Firm*—Nixon & Vanderhye PC

(57) ABSTRACT

A wheat flour, and dough made from the flour, are produced using between 5–50% (desirably 15–45%, preferably 25–35%) by weight middlings (e.g. from the first and second breaks) added to straight flour, patent flour, break flour, or clear flour. The flour with middlings can hold more free moisture, and an at least an additional 2–20% by weight dietary minerals (such as calcium, zinc, iron, manganese, phosphorus, etc.) and/or fibers, and/or other edible materials, can be added without disturbing the fermentation or baking processes. For example, bread having at least 50% (e.g. 50–200%) of the RDA of calcium per 32 gm slice may be produced without emulsifiers, calcium citrate, or other equivalent chemical additives.

38 Claims, 2 Drawing Sheets

WHEAT FLOUR FOR MINERAL-ENHANCED BAKERY PRODUCTS

This is a divisional of application Ser. No. 09/220,886, filed Dec. 28, 1999, now U.S. Pat. No. 6,126,982, the entire content of which is hereby incorporated by reference in this application.

BACKGROUND AND SUMMARY OF THE INVENTION

In the conventional production of wheat flour by milling, a selected wheat blend is first subjected to cleaning prior to its actual grinding. Two to two and a half percent of moisture is added and a rest period from eight to twenty hours follows. Commercial wheat always contains small percentages of contaminating materials such as weed seeds, mixed cereals, dirt, etc. Various conventional methods and devices are used to affect removal of this foreign matter, such as magnetic separators to remove iron and steel objects. Once the wheat kernels have been cleaned and tempered, they are ready to be ground. The tempering process of the wheat is significant to the complete milling and baking procedure.

The cleaned and tempered wheat is subjected to a series of conventional grinding operations, in which the first five or six sets of rolls exert a crushing and shearing action. Known as the "break system" and designed primarily to bring about a far-reaching separation of the tough bran from the friable endosperm, this part of the grinding process is carried out on corrugated iron rolls, called "break rolls", which revolve in opposite directions at different speeds. Each successive set of rolls takes the stock from the preceding one, after proper separation, so that they operate serially rather than in parallel. Proceeding from the first to the fifth or sixth set of break rolls, the corrugations on the rolls become finer and the setting of the rolls progressively closer.

The crushed material, called "stock", passes after each break first to a sifter or bolter equipped with a series of inclined coarse sieves on top and progressively finer sieves, which are vibrated. Here the separation of the stock proceeds to three general classes of material according to size: the coarsest fragments, retained on the top sieves and conveyed subsequently to the second break; the medium sized granular particles primarily comprising endosperm and called the "middlings"; and the finest material passing through the fine silk bottom sieves and called "break flour".

The same process is repeated at subsequent breaks, yielding flour, middlings, and progressively smaller coarse particles. The stock going to each succeeding break contains less and less endosperm until after the fifth or sixth break the remaining material is largely composed of bran flakes.

After purification, the middlings collected from each of the earlier stages are gradually ground into flour between smooth rolls, called reduction rolls. This involves a series of reduction processes in which, as in the case of breaking, the smooth rolls are set progressively closer at each succeeding set of rolls. Each reduction subjects the middlings to a crushing and rubbing action which produces finer middlings and flour, and loosens the adhering bran flakes. Each resulting stock passes through a sifter which effects the separation of fine flour, reduced middlings and larger bran fragments. The remaining middlings are again graded according to size, purified, and conveyed to the succeeding reduction rolls. The reductions are repeated until ultimately most of the endosperm has been converted into flour, and the bran separated by the sifters.

These series of breaks and reductions give rise to many flour streams, which may number as many as 30 in modern mills. Thus, each break produces flour, such as first break flour, second break flour, etc., and each reduction, in turn, produces middlings and flours. These streams, being derived from different portions of the endosperm and varying in refinement, differ in protein content, ash content, purity (absence of branny material), etc. Beginning with the first separation of the most highly refined middlings, the flour contains progressively more branny and germ impurities at each successive reduction.

The general trends in average composition of different mill streams as they progress from the head to the tail of the mill are indicated by the data in the following table compiled by Geddes:

Chemical Composition of Certain Mill Streams and By-Products Obtained in Wheat Milling

| Product | Moisture % | Total N % | Fat % | Fiber % | Ash % | Total Sugars % |
|---|---|---|---|---|---|---|
| Wheat and mill products | | | | | | |
| Wheat | 10.3 | 2.05 | 2.1 | — | 1.73 | 2.6 |
| First patent flour | 11.5 | 1.82 | 1.0 | 0.2 | 0.40 | 1.3 |
| First clear flour | 11.0 | 2.13 | 1.7 | 0.2 | 0.81 | 1.8 |
| Second clear flour | 10.4 | 2.33 | 2.0 | 0.3 | 1.34 | 2.1 |
| Red dog | 9.2 | 2.87 | 5.4 | 2.4 | 3.15 | 6.4 |
| Bran | 8.8 | 2.33 | 4.1 | 10.8 | 6.38 | 5.4 |
| Shorts | 8.9 | 2.47 | 5.2 | 8.4 | 4.10 | 6.0 |
| Germ | 8.5 | 4.84 | 11.9 | 1.8 | 4.80 | 15.1 |
| Flour streams | | | | | | |
| First break flour | 11.8 | 1.91 | 1.1 | 0.2 | 0.66 | 1.4 |
| Second break flour | 11.3 | 1.99 | 1.4 | 0.1 | 0.56 | 1.3 |
| Third break flour | 11.5 | 2.08 | 1.4 | 0.1 | 0.49 | 1.4 |
| Fourth break flour | 11.2 | 2.29 | 2.2 | 0.1 | 0.64 | 1.5 |
| Fifth break flour | 11.0 | 2.35 | 2.6 | 0.1 | 1.03 | 1.6 |
| First middlings flour | 11.5 | 1.80 | 1.0 | 0.1 | 0.36 | 1.2 |
| Third middlings flour | 11.1 | 1.80 | 1.1 | 0.1 | 0.38 | 1.4 |
| Fifth middlings flour | 10.7 | 1.89 | 0.9 | 0.1 | 0.44 | 1.5 |
| Seventh middlings flour | 11.1 | 1.96 | 1.4 | 0.1 | 0.65 | 2.5 |
| Ninth middlings flour | 10.8 | 1.84 | 1.5 | 0.2 | 0.61 | 2.0 |
| First tailings from purifier | 9.8 | 2.57 | 5.4 | 4.4 | 3.67 | 4.3 |

Depending upon which flour streams are combined to yield the final product, different commercial flour grades are obtained. If all the streams are combined, a "straight flour" is obtained. Frequently the more refined streams are kept separate and sold as "patent flours" while the remaining streams yield "clear flours". The most common types of commercial flours are "fancy patent", which contains 40 to 60 percent of straight flour and the rest patent flour; "short patent" with 60 to 80 percent; "medium patent", with 80 to 90 percent; and "long or standard patent with" 90 to 95 percent straight flour, and the rest patent flour.

In the conventional production of bakery goods from wheat flour, it is not possible to add large amounts of dietary minerals, or other edible materials, to the flour or dough since the weight of such minerals or other materials will cause the flour cell walls to collapse during the fermentation process so that despite the existence of leavening (usually yeast) the dough will not rise. That is the minerals take up space inside the cells caused by carbon dioxide production during the fermentation process and thus may cause effective "collapse" of the cells. While attempts have been made to increase the amount of dietary minerals by using chemical additives, such as calcium citrate, this can make the final product less desirable.

According to the present invention, a wheat flour, dough, and method of producing a wheat flour and dough, are provided which greatly increase the flexibility of the type of bakery goods that can be produced. The bakery goods produced according to the invention can be produced without any chemical additives (other than normal additives used in the milling and baking industry), and with an entirely natural and high quality taste and texture. The flour/dough according to the invention can retain at least 5% (e.g. 5–12%) by weight more free moisture than conventional flour/dough of similar type, e.g. between about 30–70% by weight (and any narrower range within that broad range) free moisture (that is added moisture, not inherent in the flour), and many times more dietary minerals. For example an additional about 2–20% by weight (and any narrower range within the broad range) dietary mineral (such as any one or more of calcium, folic acid, zinc, manganese, phosphorus, potassium, copper, selenium, and iron) may be provided. For instance, enough calcium can be added to the flour, with or without other minerals, to allow bread of normal (or even enhanced) taste and texture to be baked which provides about 50–200% of the RDA (for adults) of calcium per 32 gm slice, or per two slices (or other pieces) totaling 64 gm.

Another advantage according to the invention is that it effectively increases the capacity of the mill corresponding to the percentage of middlings removed.

According to one aspect of the present invention wheat flour is provided comprising or consisting essentially of about 50–95% straight flour, clear flour, break flour, and/or patent flour; and about 5–50% by weight wheat middlings. The flour may further comprise or consist essentially of an additional about 2–20% by weight dietary minerals, for example including about 2–11% by weight calcium. The flour may also include (in dough form) at least 5% (e.g. 5–18%) more free moisture than conventionally, e.g. a total free moisture of about 60–70% (e.g. 61–68%) of the total weight of the dough, conventional hand made dough has a free moisture content of about 54–55%, while typical commercial machine made dough a free moisture content of up to about 60%.

The flour of the invention preferably comprises between about 15–45% by weight middlings, and most desirably between about 25–35% by weight middlings (e.g. about 30% middlings), mixed with straight flour, or any type of patent flour (e.g. between about 75–65% by weight straight or patent flour).

According to another aspect of the present invention a method of making a baked product is provided, comprising (or consisting essentially of): (a) Milling wheat with a (conventional) break system to produce break flour and middlings. (b) Milling at least some of the middlings from (a) with a (conventional) reduction system to produce clear and patent flour. (c) Adding about 50–95% by weight straight flour, break flour, clear flour, and/or patent flour from at least one of (a) and (b) to about 5–50% wheat middlings to produce a first flour. (d) Optionally adding an additional 2–20% dietary minerals and the like to the first flour. (e) Adding free moisture, baking ingredients, and leavening to the first flour to produce a dough. (f) Fermenting the dough so that the flour cells substantially do not collapse, so that the dough rises. And, (g) baking the dough to produce a bakery product. The baking ingredients added in (e) typically include sugar (in any form), salt, oil or lard, whey, and/or other conventional ingredients.

The method may be as described above wherein (d) is practiced to add an additional at least 2% by weight calcium to the flour. The method may also be as described above wherein (d) is practiced to add at least about 6% by weight total of at least two of the following: calcium, iron, zinc, iodine, manganese, phosphorus, selenium, fiber, chromium, copper, folic acid, and potassium. The method may also be as described above wherein (a) is practiced to separate out at least 5% of the middlings from the first and second breaks (only); and wherein the middlings separated out at the first and second breaks (only) are used in the practice of (c).

The method may also be as described above wherein (c) is practiced to produce a first flour having about 15–45% by weight middlings, and/or wherein (c) is practiced to produce a first flour having about 85–55% by weight straight flour, and/or wherein (e) is practiced to add an additional at least 30% by weight (e.g. 30–70%) free moisture. The method may also be as described above wherein (a)–(g) are practiced substantially without any emulsifier, calcium citrate, or equivalent chemical additives, and wherein (c) is practiced using middlings from (a), or from (a) and (b). Also, (d) through (g) may be practiced to produce substantially bubble-free pizza crust, or (d) through (g) may be practiced to produce bread having at least 50% of the RDA of calcium per 32 gm slice, or at least 100% for two 32 gm slices.

The invention also comprises bakery goods produced by any of the methods described above. For example, the bakery product may be bread having at least 50% (e.g. about 50–200%) of the RDA of calcium, and/or the other dietary minerals described above) per 32 gm slice; or the bakery product may be pizza crust (since bubbles do not typically form in the dough according to the invention; i.e. it is substantially bubble free), or pastries.

According to another aspect of the invention baked bread may be provided containing at least about 1000 (e.g. 1000–1300) mg calcium, 20 (e.g. 20–50) mg iron, and 1000 (e.g. 1000–1500) mg dietary fiber, each per 64 grams of bread (e.g. two thin slices).

It is the primary object of the present invention to provide a new and highly advantageous flour, dough, bakery products made from the flour and dough, and method of producing the flour, dough, and bakery products according to the invention. This and other embodiments of the invention will become clear from an inspection of the detailed description, and from the appended claims.

DETAILED DESCRIPTION OF THE DRAWINGS

Figure 1:
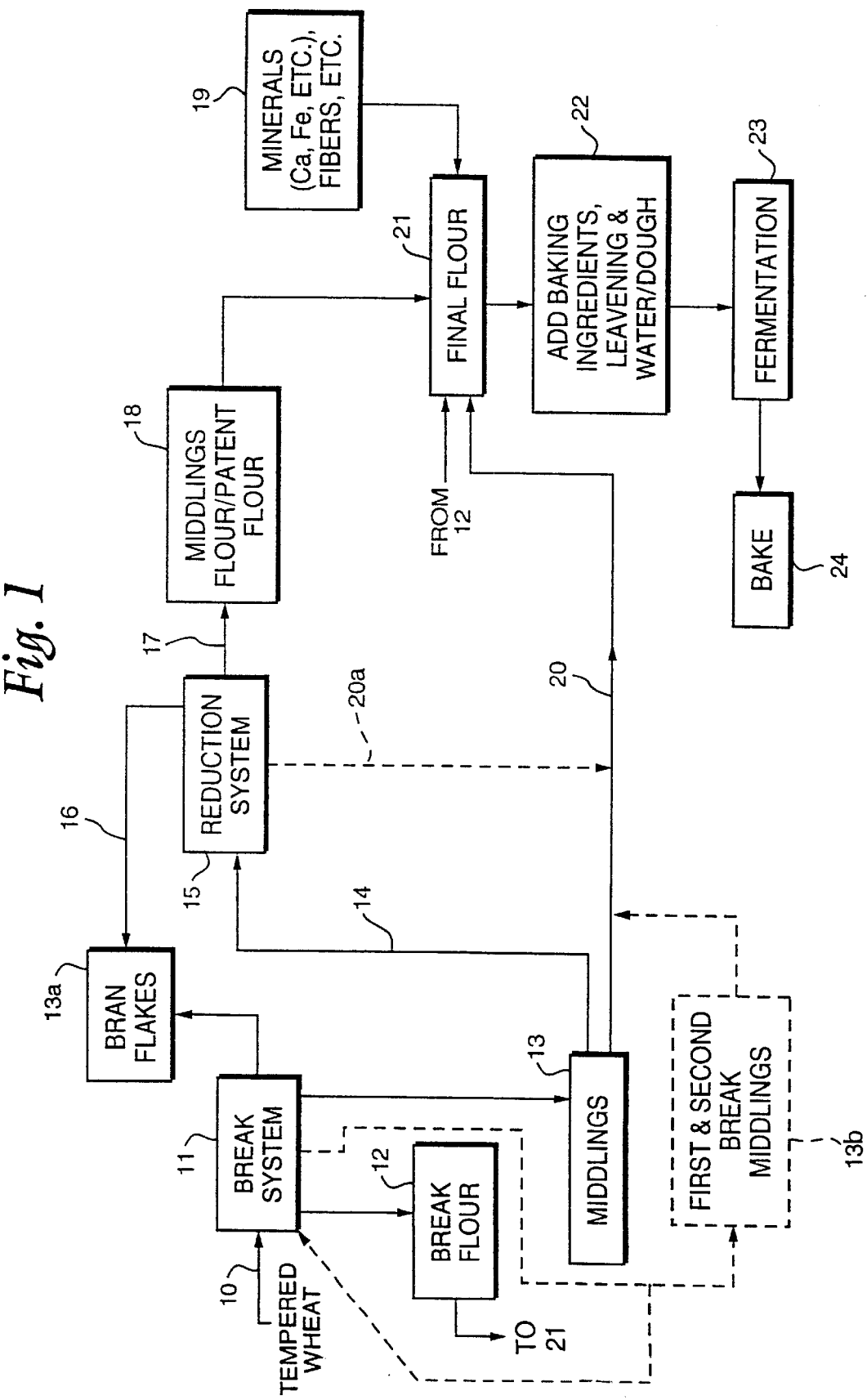
FIG. 1 is a box diagram schematically showing the practice of one exemplary method according to the present invention to produce exemplary flour, dough, and/or bakery products according to the invention.

FIG. 1 is a schematic illustration of an exemplary method according to the present invention. Tempered wheat is fed in line 10 to a conventional break system 11 containing a plurality of sets of break rolls, each set in sequence having progressively narrower spacings, as described above. Break flour is produced, as indicated at 12, by the break system 11 (including first break flour, second break flour, etc.), as well as middlings (endosperm) 13, and bran 13a. At least some of the middlings 13 are fed in line 14 to a conventional reduction system 15 where a plurality of sets of reduction rolls, again with each sequential set having progressively narrower spacings between the rolls, are provided as described above in the conventional system, producing bran as indicated in line 16, and flour as indicated in line 17. That is middling flour, including patent flour, is produced as indicated at 18. The systems 11, 15 desirably include associated conventional separation (e.g. #44–56 U.S. Standard Sieves), purification, and like equipment as described above.

According to the present invention a final flour is produced from the middling flour 18 and/or the break flour 12, with mineral addition as indicated at 19. At least some middlings 20, which pass through a #44 U.S. Standard Sieve, which may be from the middlings 13 produced by the break system 11, but which also may be at least in part from middlings from the reduction system 15, are provided as indicated by line 20 to a conventional mixer 21 (e.g. a bowl or powered mixer), or the like to produce a final flour. According to the present invention there is an almost infinite variety of materials that can be added to produce the final flour in 21, including by adding as minerals calcium, zinc, phosphorus, potassium, iron, magnesium, selenium, copper, folid acid, or virtually any other dietary mineral, as well as vitamins, dietary fiber (of any conventional type), and other materials useful for good health or enhancing taste (e.g. ham, cheese, or other food items). The minerals may be added in any suitable conventional form, pure or compound (e.g. the calcium may be in the form of aluminum sulfate). The percentage of middlings in line 20 (which may be produced from the wheat 10, or produced separately from other wheat and added as indicated at 20) preferably comprises between about 5–50% by weight of the final flour in mixer 21, desirably between about 15–45% by weight, and preferably between about 25–35% by weight (e.g. about 30%), and all narrower ranges within these broad ranges The flour added to the mixer 21 may be straight flour, break flour, clear flour, patent flour, etc., including any particular type of any of those generic classifications of flour (e.g. standard patent, or medium patent, etc.). Other types of flour (e.g. rice flour) may also be added at 21, but the wheat flour should comprise the majority of flour used.

In the milling process, which begins with the grinding of the wheat kernel at 11, the endosperm (middlings) of the first and second break, which contains little particles of bran, is taken out in the preferred embodiment of the invention, as illustrated in dotted line at 13b in FIG. 1. Where practiced, the middlings removed at 13b (from only the first and second breaks) is what is added in line 20 to mixer 21. In this case preferably substantially all the middlings from the latter breaks (e.g. third-sixth breaks), 13, pass to the reduction system 15. This separation occurs at the sifters and by using suction (negative) air at the purifiers. Some middlings (e.g. 5–25%) are separated at this point. These separated middlings have been proven to contain a high level of strength since they have not suffered the high pressure of roller mills and the high amounts of heat in the remaining milling process (i.e. the rest of system 11, and system 15). These separated middlings are separated and typically stored in a separate bin prior to feeding at 20. The separated middlings could be from five to twenty-five percent of the total middlings produced. The remaining middlings will continue the milling process (the rest of 11 and 15). In the remaining middlings, continuing in the milling process, the starch will suffer some damage caused by the roller mills.

As still another alternative, some of the middlings from the first few reductions in system 15 may be used as all or part of the middlings in line 20: See dotted line 20a in FIG. 1.

Eventually the final flour from the mixer 21 or the like is acted upon to produce dough, by adding leavening (such as yeast), conventional baking ingredients (e.g. sugar, salt, oil or lard, whey, etc.) and free moisture (typically water), as indicated schematically at 22 in FIG. 1. What is illustrated schematically at 22 may provide two or more stages, and may include one or more conventional mixers, kneaders, or the like.

The dough can be made into loaves or other shapes at 22, or subsequent to fermentation shown schematically at 23. The fermentation process indicated at 23 may be accomplished simply by keeping the dough moist and at room temperature for a desired period of time, e.g. between 20–240 minutes). Because of the strength provided by the middlings added at 20 the cells produced by carbon dioxide during the fermentation process 23 do not collapse despite the presence of minerals, fiber, and/or other constituents. Ultimately the dough which has risen is then baked in a conventional manner, as indicated schematically at 24 in FIG. 1.

Wheat in common cereals, such as Whaley, is characterized by a high carbohydrate content which averages about seventy percent of the total grain; a relatively low protein content on the order of nine to fifteen percent, and a small amount of fat, fiber, minerals, and vitamins. The carbohydrates of wheat are chiefly starch and cellulose, with small amounts of sugar and proteins. The proteins include glutelins, gliadins, glubulins, albumins and proteoses of which the first two predominate and account for the characteristic gluten formation. Lipids or fats normally amount to two percent of the whole wheat. Wheat contains a considerable number of mineral constituents which in their total make up the ash content of approximately 1.6 to 1.8 percent. The vitamins include a principal number of B group and E vitamins. Some starch damage is necessary since sugar is produced and will become food for the yeast during the fermentation process 23.

The stored "pure" middlings 13b, which pass through #44/56 U.S. Standard Sieves are carefully separated and later reunited in the process at 20, 21. The middlings 13b will give necessary strength to the cells during the fermentation period 23, to hold the cells together during baking 24, despite the evolution of $CO_2$ during period 23. Thus is it possible to bake an otherwise normal loaf of bread (29) but containing desired extraordinary high levels of minerals, vitamins, fiber, and/or proteins, something not available on the market today. For example, bread having at least about 1000 mg calcium (e.g. 1000–1200 mg), 20 (e.g. 20–50) mg iron, and 1000 (e.g. 1000–1500) mg dietary fiber in two slices (64 gm) may be produced.

Figure 3:
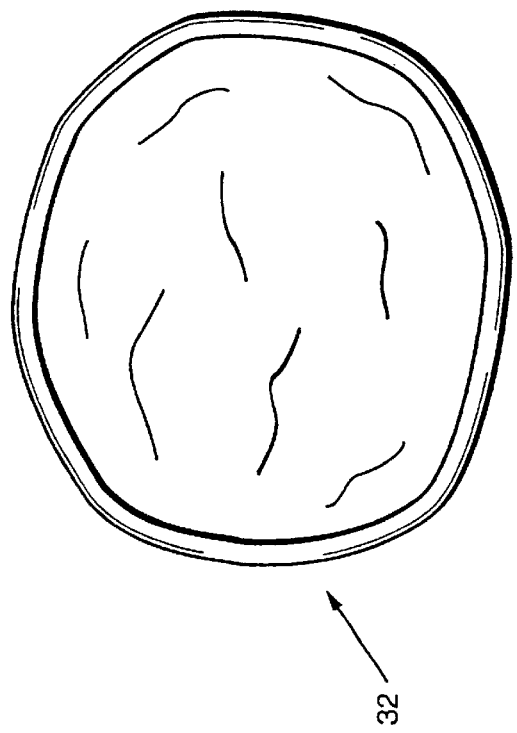
FIG. 3 is a schematic perspective view of pizza crust (shown without toppings for clarity of illustration) according to the invention.
Figure 2:
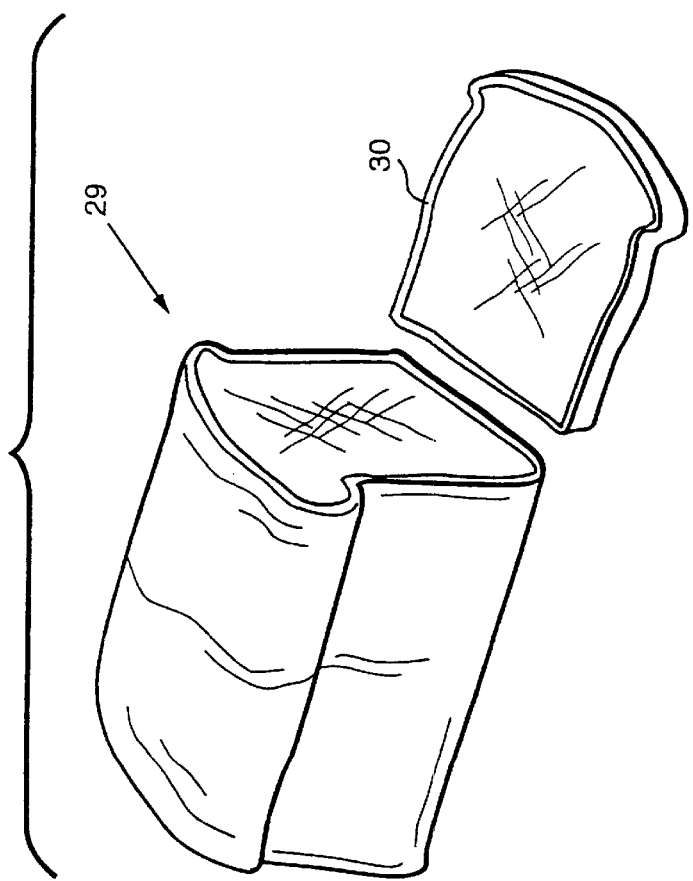
FIG. 2 is a schematic perspective view of an exemplary bakery product (bread) according to the present invention.

While any bakery product containing wheat flour can be provided according to the invention, pizza crust and bread are two particular bakery products that are highly desirable and advantageous according to the invention. For example FIG. 2 schematically illustrates a loaf of bread 29, and a slice 30 cut from the loaf 29, that may be produced according to the invention. FIG. 3 schematically illustrates pizza crust 32 (without toppings) that can be produced according to the invention.

Exemplary non-limiting examples of bakery products that may be produced according to the invention are as follows:

EXAMPLE 1

Wheat 10 was milled using a conventional break system 11 and reduction system 15. First and second break middlings 13b were separated out and added to mixer 21, about 30% by weight, with about 70% by weight of straight flour. Also an additional 3.68% by weight (of the flour produced by the middlings and straight flour) calcium was added at mixer 21. Free moisture in the amount of an additional about 65% of the combined weight of the middlings and straight flour, was added at 22, along with yeast and other conventional baking ingredients (salt and sugar), to produce dough. After fermentation at 23 by keeping the dough moist and at room temperature for roughly 60 minutes, the dough was shaped into bread loaf form, and it was then baked at 24 to produce the loaf 29. A 50 gm slice 30 of the bread 29 had excellent, normal, taste and texture (about 31.5% free moisture), and 184% of the RDA of calcium (which, at present, is 1.0 gm).

EXAMPLE 2

Wheat 10 was milled using a conventional break system 11 and reduction system 15. First and second break middlings 13b (which pass through #44 U.S. Standard Sieves, and having about 12.8% protein) were separated out and added to mixer 21, e.g. a conventional mixing bowl, about 46% by weight. About 54% by weight conventional baker's flour (about 13.2% protein) was also added to mixer 21. Also, an additional about 11.7% by weight calcium, about 0.05% by weight iron, and about 4.65% fiber (white wheat) were added. The total composition of these ingredients in the bowl 21 was thus:

| Calcium | 10.0781% |
| Iron | 0.0447% |
| Fiber | 4.0000% |
| Middlings | 40.000% |
| Baker's Flour | 45.8772 |

The ingredients were hand mixed in bowl 21 for about 5 minutes to produce a "first" flour. To the first flour still in the bowl was then introduced (see 22 in FIG. 1) an additional about 6% sugar, about 2% salt, about 2% whey, and about 0.375% yeast (all by weight). They were mixed for about 5 minutes to produce a dry pre-dough which was then placed in a conventional three-speed Hobart 200 mixer (22 in the schematic of FIG. 1). There about 2% by weight (of the first flour) oil and about 63% by weight free moisture in the form of water (at about 37° F.) were added, and all the components mixed at speed #1 for about 7 minutes, and speed #2 for about 6 minutes. The temperature of the dough produced was about 76° F. The dough was allowed to sit on a table, for about 15 minutes, but this was optional. The weight of the dough was 8 pounds, 12 oz., and it was made into 7½ loaves, each about 17 oz. Fermentation (23) then took place over a period of about 3.75 hours at a temperature of about 86° F. to produce loaves 4.75 inches high before baking.

Baking (24) took place at about 350° F. for about 25 minutes to produce loaves about 5⅜ inches high having a light crust. When the bread was inspected and tasted the following results were obtained:

Taste—Excellent (scale 1–10)=10
Color—Normal (scale 1–10)=10
Aroma—Very nice (scale 1–10)=10
Appearance—Cells open (scale 1–10)=9
Solftness—Very light (scale 1–10)=9

An analysis of the baked bread (29) found the following components for each 64 gm (two slices 30):

| Fiber | 1344 mg/64 gm |
| Moisture | 24192 mg/64 gm |
| Iron | 32 mg/64 gm |
| Calcium | 1101 mg/64 gm |

In the above description it is to be understood that the broad ranges given also include all narrower ranges within the broad ranges (e.g. a free moisture range of about 60–70% includes 61–68%, 62–65%, 61–66%, etc.).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Wheat flour to make baked products wherein the wheat flour comprises: 50–95% by weight straight flour, clear flour, break flour, and/or patent flour; and 5–50% by weight wheat middlings having an ash content of about 0.65% or less.

2. Wheat flour as recited in claim 1 consisting essentially of 50–95% by weight straight flour, clear flour, break flour, or patent flour; and 5–50% by weight wheat middlings.

3. Wheat flour as recited in claim 1 further comprising an additional about 2–14% by weight calcium.

4. Wheat flour as recited in claim 1 further comprising an additional about 2–20% by weight combined dietary minerals, dietary fibers, or dietary minerals and fibers.

5. Wheat flour as recited in claim 1 in dough form, further comprising an additional more than 60% by weight free moisture.

6. Wheat flour as recited in claim 4 wherein said flour comprises about 15–45% by weight wheat middlings from only the first and second breaks, and about 85–55% straight flour.

7. Wheat flour as recited in claim 1 comprising about 15–45% by weight wheat middlings and about 85–55% straight flour.

8. Wheat flour as recited in claim 7 wherein said 15–45% by weight wheat middlings are only from the first and second breaks.

9. Wheat flour as recited in claim 2 in dough form, further comprising an additional more than 60% by weight free moisture.

10. Wheat flour as recited in claim 5 further comprising an additional about 2–20% by weight combined dietary minerals, dietary fibers, or dietary minerals and fibers.

11. Wheat flour as recited in claim 4 further comprising an additional about 2–14% by weight calcium.

12. Wheat flour as recited in claim 2 further comprising an additional about 2–14% by weight calcium.

13. Wheat flour as recited in claim 2 wherein said flour comprises about 15–45% by weight wheat middlings from only the first and second breaks, and about 85–55% straight flour.

14. Wheat flour as recited in claim 13 further comprising an additional about 2–20% by weight combined dietary minerals, dietary fibers, or dietary minerals and fibers.

15. Wheat flour as recited in claim 1 comprising about 25–35% by weight middlings and about 75–65% by weight straight flour, clear flour, break flour, and/or patent flour.

16. Wheat flour as recited in claims 15 comprising between about 75–65% by weight straight or patent flour.

17. Wheat flour as recited in claim 16 further comprising an additional about 2–14% by weight calcium.

18. A baked product made from wheat flour wherein the wheat flour comprises: 50–95% by weight straight flour, clear flour, break flour, and/or patent flour; and 5–50% by weight wheat middlings having an ash content of 0.65% or less.

19. A baked product made from wheat flour as recited in claim 18 consisting essentially of 50–95% by weight straight flour, clear flour, break flour, or patent flour; and 5–50% by weight wheat middlings.

20. A baked product made from wheat flour as recited in claim 18 further comprising an additional about 2–14% by weight calcium.

21. A baked product made from wheat flour as recited in claim 18 further comprising an additional about 2–20% by weight combined dietary minerals, dietary fibers, or dietary minerals and fibers.

22. A baked product made from wheat flour as recited in claim 18 in dough form, further comprising an additional more than 60% by weight free moisture.

23. A baked product made from wheat flour as recited in claim 21 wherein said flour comprises about 15–45% by weight wheat middlings from only the first and second breaks, and about 85–55% straight flour.

24. A baked product made from wheat flour as recited in claim 18 comprising about 15–45% by weight wheat middlings and about 85–55% straight flour.

25. A baked product made from wheat flour as recited in claim 24 wherein said 15–45% by weight wheat middlings are only from the first and second breaks.

26. A baked product made from wheat flour as recited in claim 19 in dough form, further comprising an additional more than 60% by weight free moisture.

27. A baked product made from wheat flour as recited in claim 22 further comprising an additional about 2–20% by weight combined dietary minerals, dietary fibers, or dietary minerals and fibers.

28. A baked product made from wheat flour as recited in claim 21 further comprising an additional about 2–14% by weight calcium.

29. A baked product made from wheat flour as recited in claim 19 further comprising an additional about 2–14% by weight calcium.

30. A baked product made from wheat flour as recited in claim 19 wherein said flour comprises about 15–45% by weight wheat middlings from only the first and second breaks, and about 85–55% straight flour.

31. A baked product made from wheat flour as recited in claim 30 further comprising an additional about 2–20% by weight combined dietary minerals, dietary fibers, or dietary minerals and fibers.

32. A baked product made from wheat flour as recited in claim 18 comprising about 25–35% by weight middlings and about 75–65% by weight straight flour, clear flour, break flour, and/or patent flour.

33. A baked product made from wheat flour as recited in claim 32 comprising between about 75–65% by weight straight or patent flour.

34. A baked product made from wheat flour as recited in claim 33 further comprising an additional about 2–14% by weight calcium.

35. A baked product made from wheat flour as recited in claim 18 comprising cheese, meat or other food items.

36. Wheat flour as recited in claim 1 further comprising cheese, meat or other food items.

37. Wheat flour as recited in claim 1 wherein the wheat middlings having an ash content of 0.4% or less.

38. A baked product made from the wheat flour as recited in claim 18 wherein the wheat middlings having an ash content of 0.4% or less.

* * * * *